US010557572B2

(12) United States Patent
Banhos et al.

(10) Patent No.: US 10,557,572 B2
(45) Date of Patent: Feb. 11, 2020

(54) CONDUIT WITH DAMPING FINGERS (71) Applicant: UNITED TECHNOLGIES CORPORATION, Farmington, CT (US)

(72) Inventors: Jonas S. Banhos, Rocky Hill, CT (US); Jesse Ian Berube, Simsbury, CT (US); William Oldach, West Hartford, CT (US); Jesus S. Lopez, Royal Palm Beach, FL (US); Ravi Mandya Kumar, Newtown, CT (US); Scott David Hjelm, Somers, CT (US); Nicholas Andrew Kesler, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 133 days.

(21) Appl. No.: 15/721,350

(22) Filed: Sep. 29, 2017

(65) Prior Publication Data

US 2019/0101231 A1   Apr. 4, 2019

(51) Int. Cl.
*F16L 3/21* (2006.01)
*F16L 7/00* (2006.01)
(Continued)

(52) U.S. Cl.
CPC .................. *F16L 3/21* (2013.01); *F01D 9/02* (2013.01); *F01D 9/065* (2013.01); *F01D 25/04* (2013.01);
(Continued)

(58) Field of Classification Search
CPC . F01D 9/02; F01D 25/04; F01D 25/06; F01D 5/14; F02C 7/20
(Continued)

(56) References Cited

U.S. PATENT DOCUMENTS 4,972,671 A   11/1990 Asselin et al.
5,284,011 A   2/1994 Von Benken
(Continued)

FOREIGN PATENT DOCUMENTS

EP   3379122   9/2018
FR   3050229   10/2017
(Continued)

OTHER PUBLICATIONS

English Machine Translation of WO2015024800, Siemens, All Pages. (Year: 2015).*
European Patent Office, European Search Report dated Feb. 26, 2019 in Application No. 18192354.1.

*Primary Examiner* — Nathaniel E Wiehe
*Assistant Examiner* — David Whittaker
(74) *Attorney, Agent, or Firm* — Snell & Wilmer L.L.P.

(57) ABSTRACT

An apparatus that includes a conduit having a first end, a second end, and a longitudinal axis. The conduit may define an inner channel and may be configured to extend through a vane cavity of a vane. The apparatus may further include a damping finger that includes a first portion coupled to the conduit and a second portion diverging outward at an angled orientation from the conduit. The damping finger may be resiliently flexible and the second portion of the damping finger may be configured to contact an inner surface of the vane.

19 Claims, 5 Drawing Sheets (51) Int. Cl.
*F16L 3/205* (2006.01)
*F01D 25/04* (2006.01)
*F01D 9/02* (2006.01)
*F01D 9/06* (2006.01)
*F16F 15/073* (2006.01)

(52) U.S. Cl.
CPC ............... *F16L 3/2056* (2013.01); *F16L 7/00* (2013.01); *F05D 2220/32* (2013.01); *F05D 2230/237* (2013.01); *F05D 2230/60* (2013.01); *F05D 2260/96* (2013.01); *F16F 15/073* (2013.01)

(58) Field of Classification Search
USPC .......................................... 416/119; 415/119
See application file for complete search history.

(56) References Cited

U.S. PATENT DOCUMENTS

| | | | | |
|---|---|---|---|---|
| 5,356,264 | A | * | 10/1994 | Watson ................... F01D 25/04 415/119 |
| 8,851,844 | B2 | * | 10/2014 | Yamashita ................ F01D 5/16 415/169.3 |
| 2016/0130953 | A1 | * | 5/2016 | Brandl ................... F01D 5/147 416/95 |

FOREIGN PATENT DOCUMENTS

| | | | |
|---|---|---|---|
| FR | 3051854 | | 12/2017 |
| WO | WO2015024800 | * | 2/2015 |

* cited by examiner

CONDUIT WITH DAMPING FINGERS

FIELD

The present disclosure relates to conduits, and more specifically, to conduits through and within vanes.

BACKGROUND

In various applications, cables or pipes are routed from one location to another. For example, in a gas turbine engine, cables and/or pipes/tubes carrying fluid may extend across a fan bypass region between a split fan duct and an internal core cowl or heat shield. Such regions may be subject to high velocity air, and exposing cables, pipes, or mounting harnesses/hardware to these high velocity air regions may adversely affect the durability and/or operability of said cables, pipes, or mounting harnesses/hardware. While extending conduits through structural vanes may protect the conduit from high velocity airflow and environmental conditions, conduits in vanes may be susceptible to natural vibration modes and resonance under operating conditions of the gas turbine engine, which can result in higher mechanical stresses, diminished part life, and/or premature failure.

SUMMARY

In various embodiments, the present disclosure provides an apparatus that includes a conduit and a damping finger. The conduit has a first end, a second end, and a longitudinal axis, and the conduit defines an inner channel and is configured to extend through a vane cavity of a vane, according to various embodiments. The damping finger includes a first portion coupled to the conduit and a second portion diverging outward at an angled orientation from the conduit, according to various embodiments. The damping finger may be resiliently flexible or may otherwise be capable of resiliently bending or flexing, and the second portion of the damping finger may be configured to contact an inner surface of the vane.

In various embodiments, a tip of the second portion of the damping finger has a contact element. The contact element may be made from graphite or other wear resistant material. In various embodiments, the damping finger is made from a nickel-based super alloy. The contact element, according to various embodiments, may be exclusively disposed on a surface of the tip of the second portion of the damping finger facing away from the conduit. In various embodiments, the first portion of the damping finger is welded or brazed to the conduit. In various embodiments, the second portion of the damping finger is disposed medially along the longitudinal axis of the conduit between the first end and the second end.

In various embodiments, the damping finger is a first damping finger and the apparatus further includes a second damping finger. The second damping finger is coupled to the conduit opposite the first damping finger, according to various embodiments. The first damping finger and the second damping finger may comprise one damping finger pair of a plurality of damping finger pairs distributed medially along the longitudinal axis between the first end and the second end.

Also disclosed herein, according to various embodiments, is a gas turbine engine that includes a vane extending between a radially inward structure and a radially outward structure, the vane defining a vane cavity. The gas turbine engine may also include a conduit extending through the vane cavity and defining an inner channel configured to convey at least one of fluid and wiring between the radially inward structure and the radially outward structure. The gas turbine engine may further include a damping finger having a first portion coupled to the conduit and a second portion diverging outward at an angled orientation from the conduit, wherein the damping finger is configured to have resiliently flexible properties and a tip of the second portion of the damping finger contacts an inner surface of the vane.

In various embodiments, the vane includes a leading edge, a trailing edge, and two opposing sides extending between the leading edge and the trailing edge, wherein the inner surface is of one of the two opposing sides. In various embodiments, the damping finger is a first damping finger and the gas turbine engine further includes a second damping finger, wherein the second damping finger is coupled to the conduit opposite the first damping finger such that the second damping finger contacts the inner surface of the other of the two opposing sides. In various embodiments, the tip of the second portion of the damping finger includes a contact element. In various embodiments, the contact element is exclusively disposed on a surface of the tip of the second portion of the damping finger facing away from the conduit.

In various embodiments, the first portion is radially outward of the second portion. In various embodiments, the first portion of the damping finger is welded or brazed to the conduit. The second portion of the damping finger may be disposed medially between the radially inward structure and the radially outward structure.

Also disclosed herein, according to various embodiments, is a method of assembling a gas turbine engine. The method may include depressing a second portion of a damping finger towards a conduit, wherein a first portion of the damping finger is coupled to the conduit and the second portion diverges outward at an angled orientation from the conduit in an undepressed state. The method may also include inserting the conduit through an aperture defined in a radially outward structure of the gas turbine engine, wherein the aperture opens to a vane cavity of a vane that extends between the radially outward structure and a radially inward structure.

In various embodiments, a cross-sectional diameter of the aperture is greater than a first cumulative cross-sectional diameter of the conduit and the first portion of the damping finger and less than a second cumulative cross-sectional diameter of the conduit and the second portion of the damping finger in an undepressed state.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a conduit apparatus that has one or more damping fingers that are configured to contact an inner surface of a housing through which the conduit extends. The damping fingers inhibit excessive and/or resonant vibrational frequencies, thereby reducing mechanical stresses and improving the operational life of the conduit and the encompassing vane. While numerous details are included herein pertaining to conduits extending through vanes of a gas turbine engine, the details of the conduit provided herein may be utilized in various applications.

Figure 1:
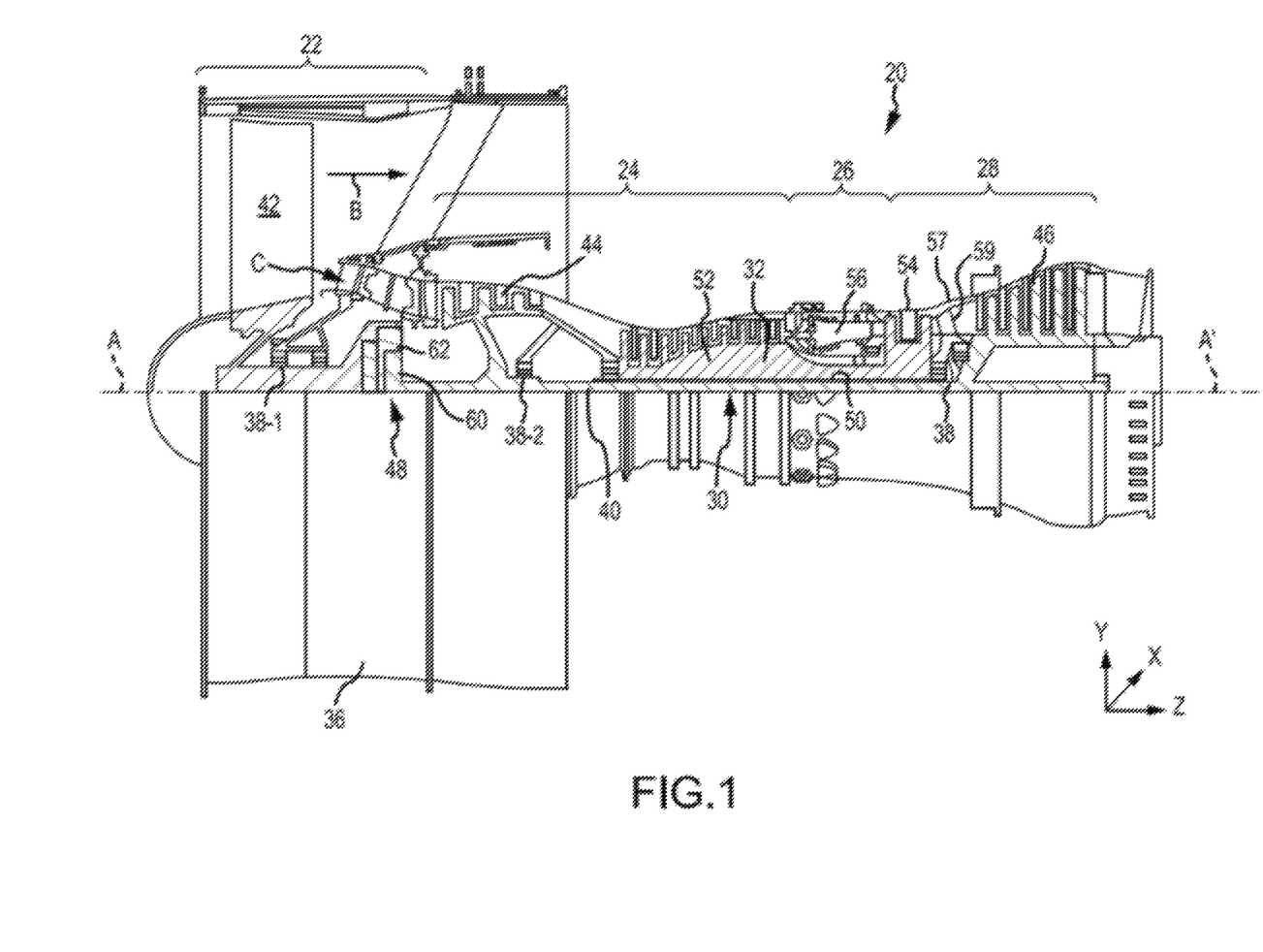
FIG. 1 is a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions and the x direction on the provided xyz axis refers to the circumferential direction. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
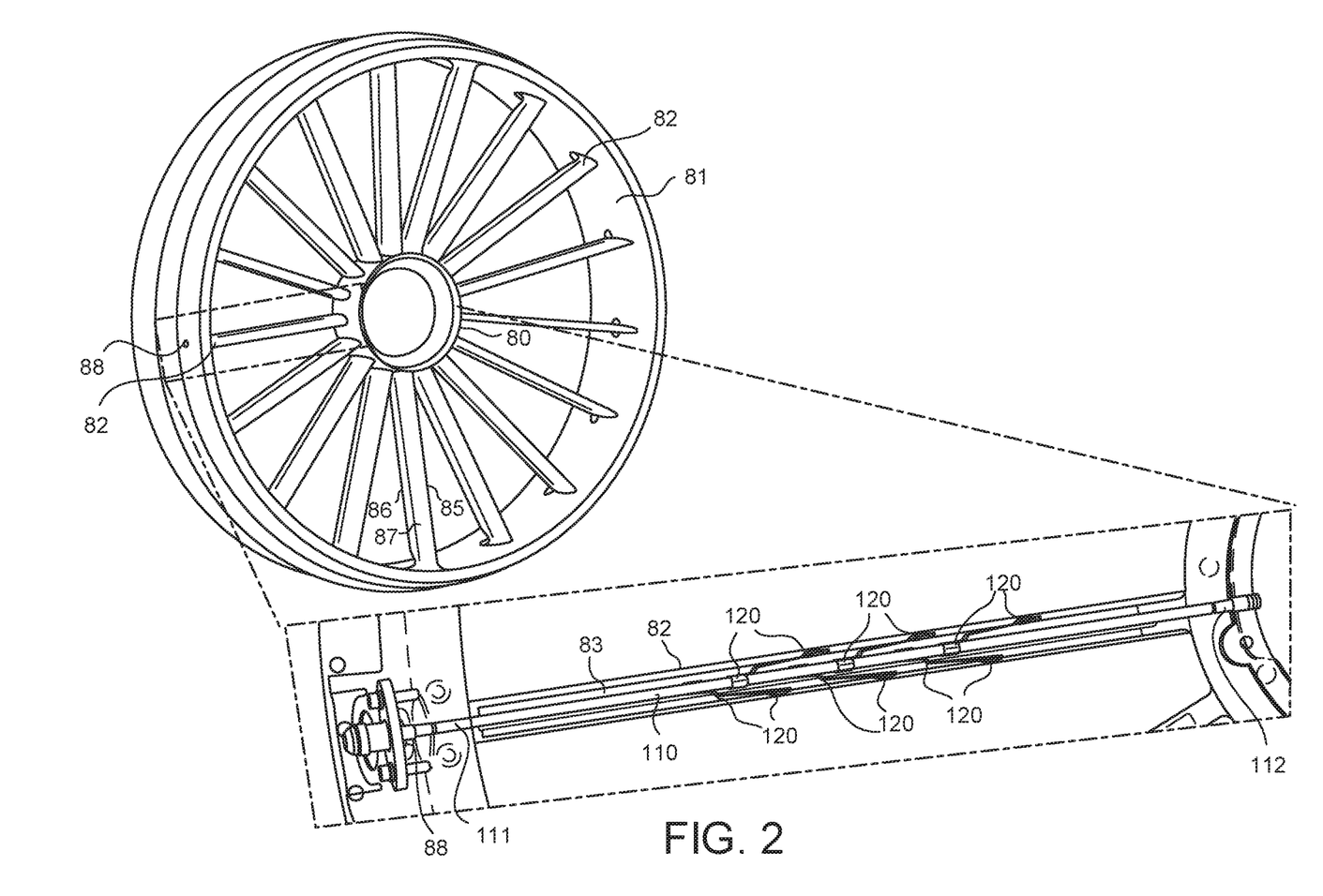
FIG. 2 is a perspective view of a damping apparatus disposed within a vane cavity of a vane, including a magnified view of the damping apparatus having a conduit and a damping finger, in accordance with various embodiments.
Figure 3:
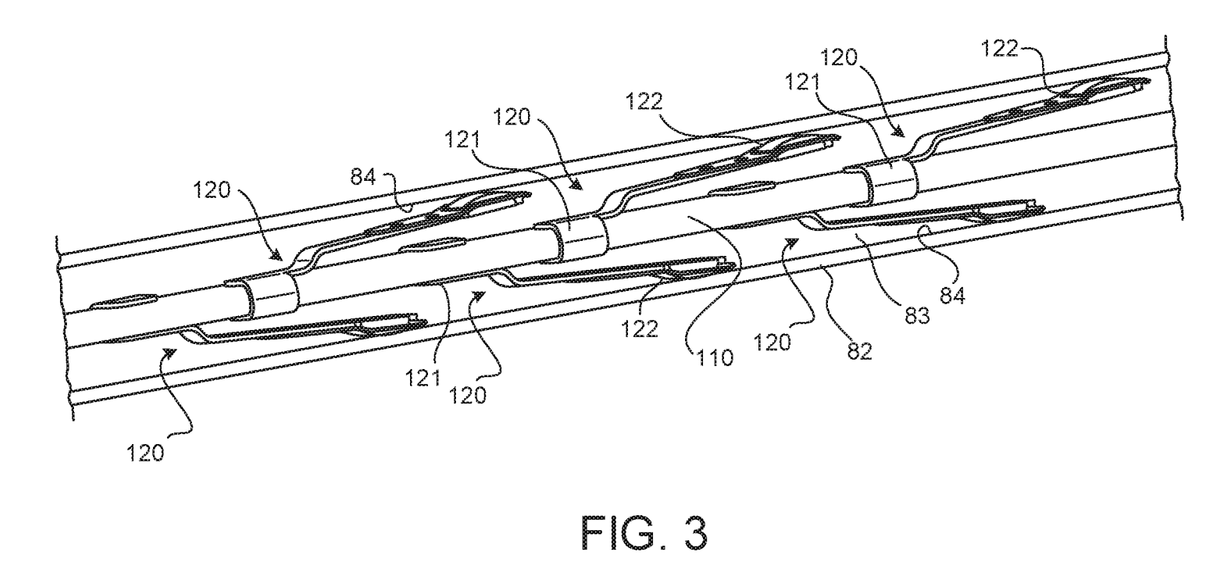
FIG. 3 is a perspective view of a damping apparatus disposed within a vane cavity of a vane, in accordance with various embodiments.
Figure 4A:
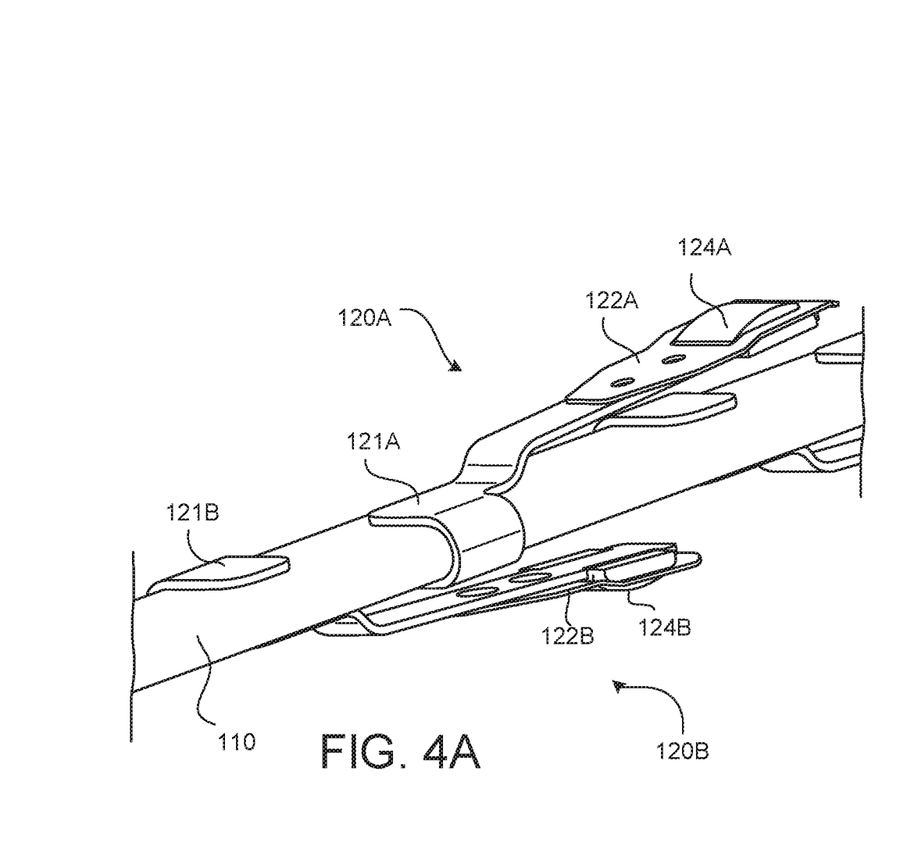
FIG. 4A is a perspective view of a damping finger mounted to a conduit, in accordance with various embodiments.
Figure 4B:
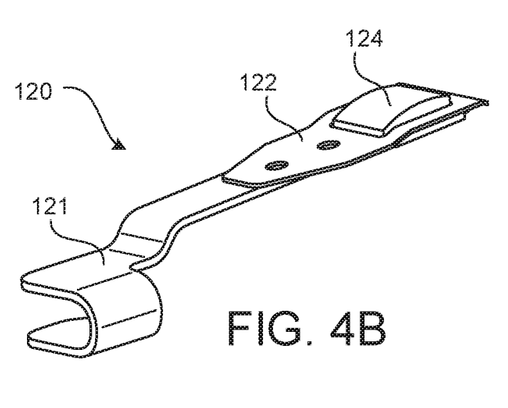
FIG. 4B is a perspective view of a damping finger, in accordance with various embodiments.
Figure 4C:
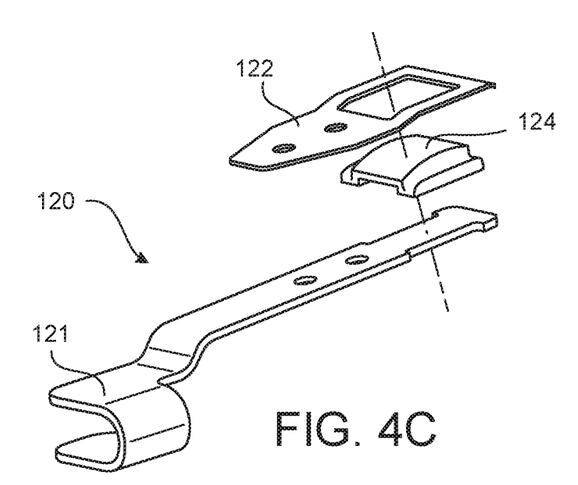
FIG. 4C is a perspective exploded view of a damping finger, in accordance with various embodiments.

In various embodiments, and with reference to FIGS. 2 and 3, a damping apparatus is provided that includes a conduit 110 and at least one damping finger 120. The conduit has a first end 111, a second end 112, and a longitudinal axis, and also defines an inner channel, according to various embodiments. The conduit 110 is generally configured to extend through a housing, such as a structural support vane 82 of gas turbine engine 20, and is configured to convey fluids and/or wiring. The damping finger 120 includes a first portion 121 coupled to the conduit 110 and a second portion 122 diverging radially outward at an angled orientation from the conduit 110, according to various embodiments. The damping finger 120 may have resiliently flexible properties. For example, the damping finger 120 may be made from a resiliently flexible material and/or may be made from a resilient material that is shaped and configured so as to be capable of resiliently bending or flexing in response to the second portion 122 of the damping finger contacting an inner surface 84 of the housing, (e.g., vane 82) to damp vibrations and other frequency mode response, (e.g., vane). In various embodiments, the damping finger 120 may be made from a high performance nickel-based super alloy (i.e., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y.). As another example, the damping finger 120 may include a cobalt-nickel-chromium-tungsten alloy (i.e., an alloy that comprises, by wt %, 39% cobalt, 22% nickel, 22% chromium and 14% tungsten that is available under the trademark HAYNES™ 188, available from Haynes International, Inc. of Kokomo, Ind., USA). As yet another example, the damping finger may include an austenitic nickel-chromium-based alloy (i.e., an alloy that by comprises, by wt %, between 17% and 21% chromium, between 2.8% and 3.3% molybdenum, between 50% and 55% nickel, and between 4.75% and 5.5% niobium that is available under the trade name INCONEL 718, available from the Special Metals Corporation of Huntington, W. Va., USA). Because the conduit 110 is supported within the housing/vane via the one or more resiliently flexible damping fingers 120, detrimental frequencies of the conduit are damped, thus reducing mechanical stresses experienced by the conduit 110 and the surrounding structure.

In various embodiments, and with continued reference to FIGS. 2 and 3, fluid or wiring may be routed through the conduit 110, and the conduit 110 may extend through a vane 82 that spans between a radially inward structure 80 and a radially outward structure 81 of the gas turbine engine 20. That is, the gas turbine engine 20 may include a radially inward structure 80, such as a hub or other centrally disposed structure, and a radially outward structure 81, such as a case structure. For example, the vane 82 may extend across a fan bypass region between a split fan duct and an internal core cowl or heat shield. The vane may define a vane cavity 83, through which the conduit 110 extends.

In various embodiments, and with reference to FIGS. 3, 4A, 4B, and 4C, the first portion 121 of the damping finger 120 is welded, brazed, or otherwise connected/coupled to the conduit 110. A tip or end section of the second portion 122 of the damping finger 120 may include a contact element 124. The contact element 124 may facilitate installation of the conduit 110 through and within the vane cavity 83, as described in greater detail below with reference to FIG. 5. In various embodiments, the contact element 124 is made from a graphite material or other wear resistant material. The contact element may 124 be exclusively disposed on a surface of the tip of the second portion 122 of the damping finger 120 that is facing away from the conduit 110. In various embodiments, and with reference to FIGS. 4B and 4C, the contact element 124 is detachably coupled to the second portion 122 of the damping finger 120. In various embodiments, the contact element 124 is replaceable. In various embodiments, the second portion 122 of the damping finger is made from or includes a coating or other material that facilitates damping.

In various embodiments, and with reference to FIG. 2, the damping finger 120 may be disposed medially between the first and second ends 111, 112 of the conduit 110, and thus medially between the radially inward structure 80 and the radially outward structure 81. In various embodiments, and with momentary reference to FIG. 4C, the damping finger 120A is a first damping finger and the damping apparatus further includes a second damping finger 120B (e.g., the damping apparatus may include a plurality of damping fingers). The first and second damping fingers 120A, 120B may be coupled to opposite sides of the conduit 110. Said differently, and with reference to FIG. 4A, the second damping finger 120B may be coupled to the conduit 110 opposite the first damping finger 120A. In various embodiments, the first and second damping fingers 120A, 120B may be one damping finger pair of a plurality of damping finger pairs. These damping finger pairs may be distributed along the longitudinal axis of the conduit 110 between the first end 111 and the second end 112, and thus distributed between the radially inward structure 80 and the radially outward structure 81. In various embodiments, all of the damping finger are disposed medially along the conduit.

In various embodiments, and with renewed reference to FIG. 2, the vane 82 may include a leading edge 85, a trailing edge 86, and two opposing sides 87 extending between the leading edge and the trailing edge. The inner surface 84 against which the second portion 122 of the damping finger 120 is engaged is one of these two opposing sides, according to various embodiments. In various embodiments, a pair of opposing damping fingers (e.g., 120A, 120B) may engage the opposing sides of the vane 82, respectively. Said differently, a first damping finger 120A may contact a first inner surface and a second damping finger 120B opposite the first damping finger 120A may contact a second inner surface opposite the first inner surface.

Figure 5:
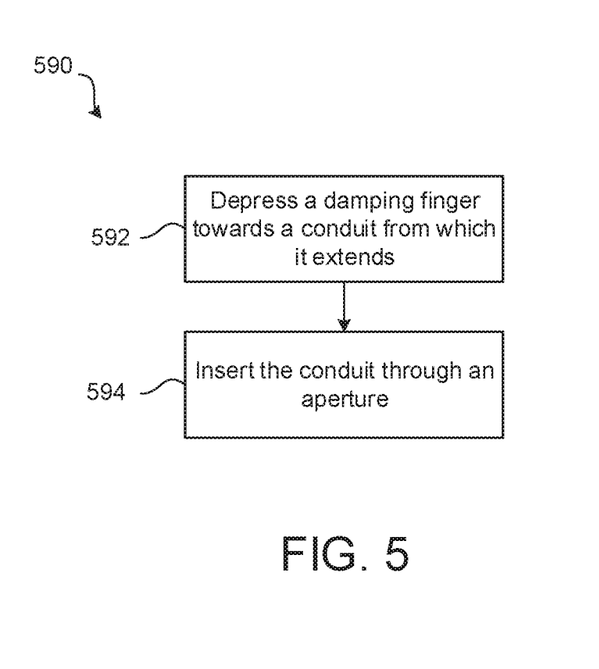
FIG. 5 is a schematic flow chart diagram of a method of assembling a gas turbine engine, in accordance with various embodiments.

In various embodiments, and with reference to FIG. 5, a method 590 of assembling a gas turbine engine 20 is provided. The method 590 may include depressing the damping finger 120 towards the conduit 110 at step 592 and inserting the conduit 110 through an aperture 88 (see FIG. 2) at step 594. In various embodiments, and with momentary reference to FIG. 2, the aperture 88 may be defined in the radially outward structure 81 and may be open to the vane cavity 83 defined within the vane 82. In various embodiments, a user may only have access to the radially outward structure 81 (and not the radially inward structure). In various embodiments, a cross-sectional diameter of the aperture 88 is greater than a first cumulative cross-sectional diameter of the conduit 110 and the first portion 121 of the damping finger 120 and less than a second cumulative cross-sectional diameter of the conduit 110 and the second portion 122 of the damping finger 120 in an undepressed state. In various embodiments, the cross-sectional diameter of the aperture 88 is less than 50% of the diameter of the vane cavity 83. In various embodiments, the first portion 121 of the damping finger 120 is radially outward of the second portion 122, thereby allowing the second end 112 of the conduit 110 and the second portion 122 of the damping finger 120 to be inserted (step 594) through the aperture 88 before the first end 111 of the conduit 110 and before the first portion 121 of the damping finger 120. This enables the conduit 110 to be subsequently withdrawn from the vane cavity 83 via the aperture 88, as the first portion 121 of the damping finger 120 fits through the aperture 88 and the action of withdrawing the conduit 110 depresses the second portion 122 of the damping finger 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
   a conduit comprising a first end, a second end, and a longitudinal axis, wherein the conduit defines an inner channel and is configured to extend through a vane cavity of a vane; and
   a damping finger comprising a first portion coupled to the conduit, and a second portion diverging outward from the first portion at an angle relative to the longitudinal axis of the conduit, wherein the damping finger is resiliently flexible and the second portion of the damping finger is configured to contact an inner surface of the vane; wherein: the first portion comprises an attachment surface in contact with the conduit; the first portion comprises a first surface, opposite the attachment surface, that faces away from the longitudinal axis of the conduit; a second surface of the second portion faces away from the longitudinal axis of the conduit; and the first surface is continuous with the second surface.

2. The apparatus of claim 1, wherein an engagement surface of the second portion of the damping finger comprises a contact element.

3. The apparatus of claim 2, wherein the damping finger comprises a nickel-based super alloy.

4. The apparatus of claim 2, wherein the contact element is detachably coupled to the second portion of the damping finger.

5. The apparatus of claim 1, wherein the second portion of the damping finger is disposed medially along the longitudinal axis of the conduit between the first end and the second end.

6. The apparatus of claim 1, wherein the damping finger is a first damping finger and the apparatus further comprises a second damping finger, wherein the second damping finger is coupled to the conduit opposite the first damping finger.

7. The apparatus of claim 6, wherein the first damping finger and the second damping finger comprise one damping finger pair of a plurality of damping finger pairs distributed medially along the longitudinal axis between the first end and the second end.

8. The apparatus of claim 1, wherein the first portion of the damping finger is brazed to the conduit.

9. A gas turbine engine comprising:
a vane extending between a radially inward structure and a radially outward structure, the vane defining a vane cavity;
a conduit extending through the vane cavity and defining an inner channel configured to convey at least one of fluid and wiring between the radially inward structure and the radially outward structure; and
a damping finger comprising a first portion coupled to the conduit and a second portion diverging outward from the first portion at an angle relative to a longitudinal axis of the conduit, wherein the damping finger is resiliently flexible and a tip of the second portion of the damping finger contacts an inner surface of the vane;
wherein:
the first portion comprises an attachment surface in contact with the conduit;
the first portion comprises a first surface, opposite the attachment surface, that faces away from the longitudinal axis of the conduit;
a second surface of the second portion faces away from the longitudinal axis of the conduit; and
the first surface is continuous with the second surface.

10. The gas turbine engine of claim 9, wherein the vane comprises a leading edge, a trailing edge, and two opposing sides extending between the leading edge and the trailing edge, wherein the inner surface is of one of the two opposing sides.

11. The gas turbine engine of claim 10, wherein the damping finger is a first damping finger and the gas turbine engine further comprises a second damping finger, wherein the second damping finger is coupled to the conduit opposite the first damping finger such that the second damping finger contacts the inner surface of the other of the two opposing sides.

12. The gas turbine engine of claim 10, wherein the tip of the second portion of the damping finger comprises a contact element.

13. The gas turbine engine of claim 12, wherein the contact element is detachably coupled to the second portion of the damping finger.

14. The gas turbine engine of claim 9, wherein the first portion is radially outward of the second portion.

15. The gas turbine engine of claim 9, wherein the first portion of the damping finger consists of a segment of the damping finger that is directly in contact with the conduit.

16. The gas turbine engine of claim 9, wherein the second portion of the damping finger is disposed medially between the radially inward structure and the radially outward structure.

17. The gas turbine engine of claim 9, wherein the first portion of the damping finger is brazed to the conduit.

18. A method of assembling a gas turbine engine, the method comprising:
depressing a second portion of a damping finger towards a conduit, wherein a first portion of the damping finger is coupled to the conduit and the second portion diverges outward from the first portion at an angle relative to a longitudinal axis of the conduit in an undepressed state; and
inserting the conduit through an aperture defined in a radially outward structure of the gas turbine engine, wherein the aperture opens to a vane cavity of a vane that extends between the radially outward structure and a radially inward structures;
wherein:
the first portion comprises an attachment surface in contact with the conduit;
the first portion comprises a first surface, opposite the attachment surface, that faces away from the longitudinal axis of the conduit;
a second surface of the second portion faces away from the longitudinal axis of the conduit; and
the first surface is continuous with the second surface.

19. The method of claim 18, wherein a cross-sectional diameter of the aperture is greater than a first cumulative cross-sectional diameter of the conduit and the first portion of the damping finger and less than a second cumulative cross-sectional diameter of the conduit and the second portion of the damping finger in an undepressed state.

* * * * *

UNITED STATES PATENT AND TRADEMARK OFFICE
CERTIFICATE OF CORRECTION

Page 1 of 1

PATENT NO. : 10,557,572 B2
APPLICATION NO. : 15/721350
DATED : February 11, 2020
INVENTOR(S) : Jonas S. Banhos et al.

It is certified that error appears in the above-identified patent and that said Letters Patent is hereby corrected as shown below:

In the Claims

In Claim 18, at Column 10, Line 24, please delete "structures" and insert --structure--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*